United States Patent [19]

Francis et al.

[11] 4,367,994
[45] Jan. 11, 1983

[54] BLIND FASTENER AND METHOD OF MANUFACTURE THEREOF

[75] Inventors: Albert C. Francis, Stevenage; Frederick A. Summerlin, St. Albans, both of England

[73] Assignee: AERPAT A.G., Zug, Switzerland

[21] Appl. No.: 175,037

[22] Filed: Aug. 4, 1980

[30] Foreign Application Priority Data

Aug. 14, 1979 [GB] United Kingdom ............... 7928346

[51] Int. Cl.³ .............................................. F16B 19/10
[52] U.S. Cl. ......................................... 411/43; 411/70
[58] Field of Search ....................... 411/70, 34, 43, 44, 411/38, 36, 15

[56] References Cited

U.S. PATENT DOCUMENTS 3,149,530  9/1964  Kolec ..................................... 411/70

Primary Examiner—Ramon S. Britts
Attorney, Agent, or Firm—Oblon, Fisher, Spivak, McClelland & Maier

[57] ABSTRACT

A blind bolt is of the type comprising a tubular shell 14 through which extends a stem 13 with an enlarged head 12 at one end which, in installation of the bolt, is pulled into the shell 14 to expand it and form a blind head. The stem 11 is provided with two opposed deformations 19 to prevent the shell falling off the stem before installation. Each deformation has a relatively shallow sloping profile with its higher end towards the shell, and the width of the deformation is a maximum at the bottom end of the slope and a minimum at its higher end. The deformations are formed by pinching up portions of the stem between two opposed dies, the shape of the bite between the dies being tapered in the direction along the stem.

9 Claims, 9 Drawing Figures

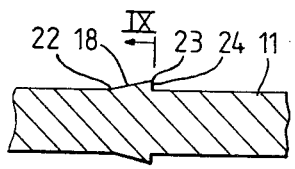
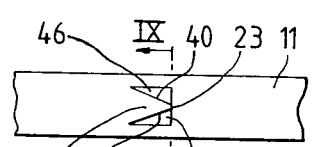
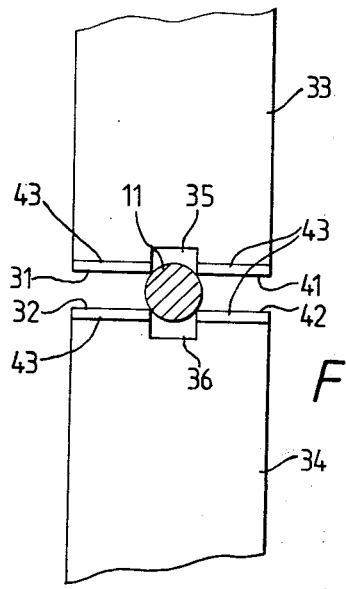
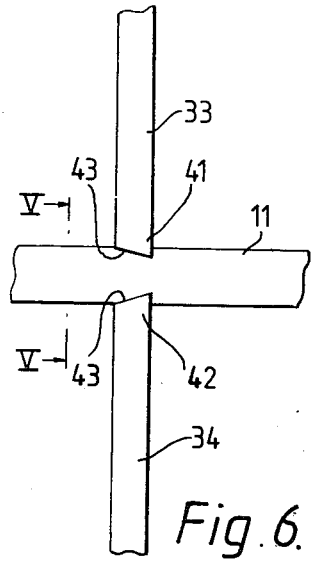
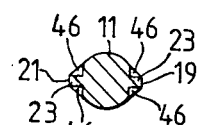
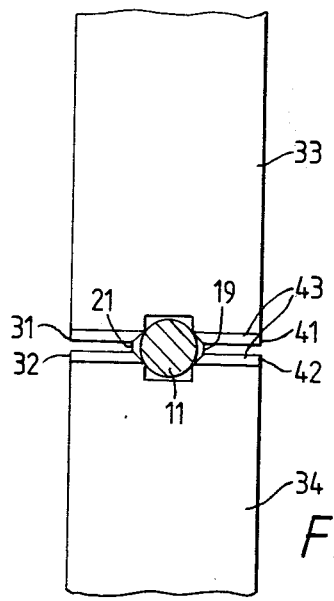
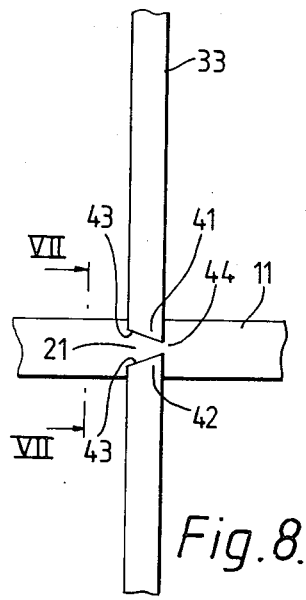

BLIND FASTENER AND METHOD OF MANUFACTURE THEREOF

The invention relates to a blind fastener and a method of manufacture thereof. More particularly, the invention relates to a blind fastener comprising a stem and a shell.

The invention provides, in one of its aspects, a blind fastener comprising a stem and a shell;

the stem having an enlarged head at one end and a pulling portion at the other end; the shell being assembled on the stem between the head and the pulling portion thereof; the fastener being adapted to be installed by relative movement between gripping means which grip the pulling portion of the stem and a nose which surrounds the stem, so that the nose is advanced towards the shell and supports it at one end whilst the stem head is pulled into its other end to form a blind head; the stem having at least one outward deformation at a position between the shell and pulling portion to retain the shell on the stem; which outward deformation has a relatively shallow sloping profile on the side thereof facing towards the pulling portion; whereby while the fastener is being installed as aforesaid, the nose can move past the deformation by engaging the aforesaid relatively shallow sloping profile and pushing the deformation in towards the stem without carrying material away from the deformation to contaminate the shell.

Preferably in the deformation the width is at a maximum at the bottom end of the aforesaid relatively shallow sloping profile, and progressively decreases as the sloping profile increases in height. In a preferred embodiment, the stem carries two deformations on opposite sides of the stem. Preferably there is provided at least one space adjacent the deformation into which at least part of the material of the deformation is pushed back.

The invention includes a blind fastener as aforesaid, in which the or each deformation is formed by pinching between opposed ends of a pair of dies.

The invention provides, in another of its aspects, a method of manufacturing a blind fastener comprising a shell and a stem with an enlarged head, which method comprises the steps of:

assembling the shell onto the stem towards the enlarged head so as to leave a portion of the stem protruding from the end of the shell remote from the stem head;

and forming a local deformation on the protruding portion of the stem, to prevent subsequent disassembly of the shell from the stem, by pinching up a peripheral portion of the stem between two opposed dies brought towards each other substantially tangentially of the peripheral portion, the shape of the bite between the two dies being tapered in a direction along the stem;

so that the shape of the deformation pinched up by the die has a height radially of the stem which increases progressively from the protruding end of the stem towards the head end of the stem.

Preferably the method comprises forming two such local deformations on opposite sides of the stem.

A specific embodiment of the invention will now be described by way of example and with reference to the accompanying drawings, in which:

FIG. 3 is an axial section through the part of the stem carrying the deformations;

FIG. 4 is a plan view of the part of the stem shown in FIG. 3;

FIGS. 5 and 6 are elevations of two dies at the start of the deforming process (FIG. 5 being taken on the line V—V of FIG. 6);

FIGS. 7 and 8 correspond to FIGS. 5 and 6 and show the end of the deforming process; and FIG. 9 is a section on the line IX—IX of FIGS. 3 and 4.

Figure 1:
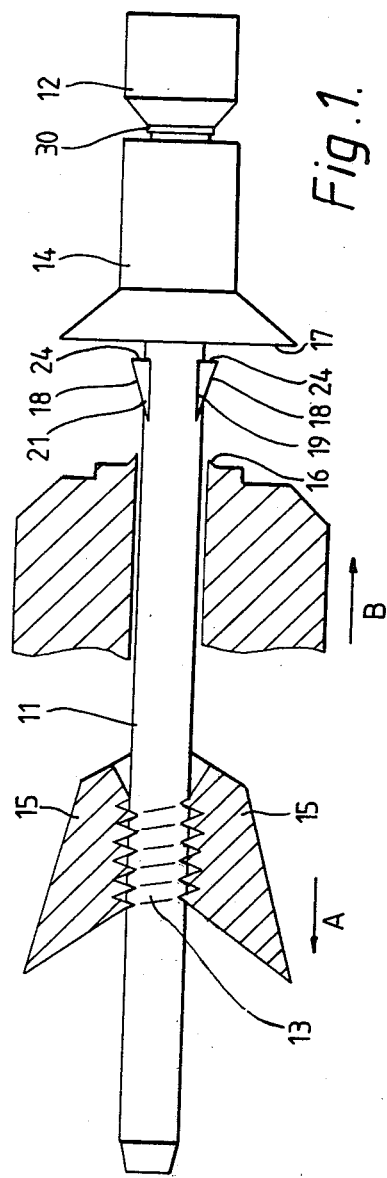
FIG. 1 is a side elevation of a rivet, also illustrating, schematically and in section, the nose and pulling means of a riveting tool used during the installation of the rivet.
Figure 2:
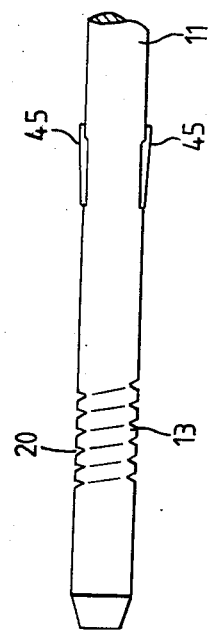
FIG. 2 is a side elevation of part of the rivet stem after the tool has acted on it.

The blind fastener of this example is a blind bolt or rivet of the type described in British Pat. No. 1,538,872 and U.S. Pat. No. 4,046,053, and commercially available under the trade marks MONOBOLT and MBC. Essentially it comprises an elongated stem 11 having an enlarged head 12 at one end and a pulling portion 13 at the other end. Assembled on the stem between the head and the pulling portion is a tubular shell 14 having a bore therethrough. The stem and shell are manufactured separately and assembled to form the fastener by inserting the stem into the shell bore from the appropriate end (so that the stem head 12 is remote from the shell head 17), and sliding the shell along the stem until it is adjacent the stem head, leaving the pulling portion 13 protruding from the end of the shell remote from the head 12. In order to install the rivet, the stem head 12 and shell 14 are inserted into overlying apertures in the members to be joined, and a suitable tool having pulling means (in this example, jaws 15) and a nose in the form of an annular anvil 16 is used. The pulling portion 13 of the stem is inserted into the annular anvil 16 and jaws 15, as illustrated in FIG. 1. The tool is then actuated, so that the jaws 5 grip the pulling portion of the stem (causing indentations such as indicated at 20 in FIG. 2), and the jaws and anvil are moved away from each other, in the respective directions indicated by arrows A and B in FIG. 1. The anvil 16 advances until it contacts the shell 14 and its head end 17, and the stem head 12 is then pulled into the other end of the shell to enlarge it and form a blind head. This clamps the members together between the blind head and the shell head 17. The part of the stem 11 protruding from the shell is then broken off from the installed fastener.

This particular type of blind fastener has the advantage that, on installation, the shell and stem are positively locked together. The precise form of lock used is no part of the present invention, but, for example, the lock may be formed by the anvil 16 deforming an annular extension or skirt 30 at the adjacent end of the stem head 12 after the stem head has been fully pulled into the shell 14. Successful formation of such a lock requires that there is a minimum clearance between the annular anvil 16 and the stem 11 (the clearance is exagerated in FIG. 1 for clarity of illustration), and that no foreign body is present between the anvil 16 and the locking portion of the stem head when the locking action takes place.

Another practical requirement of any such stem-and-shell blind fastener is that, once the shell and stem have been assembled together, they will not become disassembled (i.e. fall apart) during subsequent packing, transit, and insertion in an installation tool. One method which has been tried is crimping the tail end of the shell 14 (i.e. the end nearer the stem head 12 and remote from the shell head 17) onto the stem. However, it was found that this tended to induce splitting of the shell upon installation of the fastener. A knurling or other radially outward deformation of the stem, at a position between the shell and the pulling portion, was tried. However, it was found that, upon installation of the fastener, the anvil 16 advancing along the stem carried away part of the material of the deformed portion of the stem, which remained in front of the anvil and interfered with the proper formation of a reliable lock by the anvil, and introduced the possibility of loose pieces of metal contaminating the environment.

Accordingly, the present invention provides a deformation 19 having a relatively shallow sloping profile 18 on the side thereof facing towards the pulling portion 13 i.e. facing towards the advancing anvil 16. In this particular embodiment, two such deformations 19, 21 are provided on opposite sides of the stem. As illustrated in FIG. 4, the width of the deformation (in a direction peripherally of the stem) is maximum at the bottom end 22 of the slope and progressively narrows as the slope increases in height (i.e. radially of the stem) to its peak 23. The deformation thus has side faces 40 at an angle to the length of the stem. At the peak, the deformation drops away substantially perpendicularly towards the stem face, in a relatively narrow edge face 24.

These two deformations effectively retain the shell 14 against disassembly from the stem 11, and end faces 24 acting as positive abutments in the path of the shell. However, in the initial stages of installation, as the anvil 16 advances along the stem 11 towards the shell, the relatively shallow slope 18 which the anvil meets facilitates the anvil pushing the deformation back down towards the stem, without carrying away any material from the deformation, as shown at 45 in FIG. 2. Pushing down of the material of the deformation at least partially refills spaces 46, 46 on each side of the deformation, from which the deformation was originally pinched up.

The method of forming the deformations, according to the invention, is illustrated in FIGS. 5 to 8. Each deformation is pinched up from the peripheral region of the stem 11 by means of two opposed dies 31, 32 and 41, 42. An upper die member 33 carries two dies 31, 41 on opposite corners of a cut-out 35 which is big enough to accommodate nearly half the cross-section of the stem 11, while the lower die member 34 carries two lower dies 32, 42 on opposite corners of a similar cut-out 36. The distance across each cut-out between adjacent dies 31 and 41 is slightly less than the diamter of the stem 11, and similarly with dies 32 and 42. Each die has a sloping face (designated 43 for all four dies) which slope is at the same angle as the slope of the side face 40 of the finished deformation 19, 21 with respect to the axis of the stem (see FIG. 4). After the assembly of the shell 14 onto the stem 11, the stem is placed between the pairs of dies, as illustrated in FIG. 6, so that the dies are located between the shell and the pulling portion of the stem, and the die members 33 and 34 advance towards each other, until they reach the position illustrated in FIGS. 7 and 8.

Each pair of opposed dies 31, 32 and 41, 42 pinches up part of the material of the stem 11 to form one of the deformations 19, 21. The dies are advanced into the stem substantially tangentially of the cross-section. Due to the opposed sloping faces 43, 43 of each die pair, the shape of the bite between the die faces of each pair tapers in a direction along the stem, as illustrated in FIGS. 6 and 8. Since at one end 44 of the die faces, the die faces are closer together, and the curvature of the circular stem section provides more stem material between the die faces at this end, material is pinched up higher (i.e. radially further out) from the stem at this end. As the distance between the die faces increases along the stem, the height to which material is pinched up decreases. Consequently, the shape of the deformation pinched up by the dies has a height radially of the stem which increases progressively from the end thereof which is towards the protruding end of the stem to the end thereof towards the head end of the stem.

Spaces 46 are left on each side of each deformation, from which material has been pinched up, and into which it is at least partially pushed back by the tool nose as previously described.

This invention is not restricted to the details of the foregoing example.

We claim:

1. A blind fastener comprising a stem and a shell;
   the stem having an enlarged head at one end and a pulling portion at the other end;
   the shell including a first bore, the portion of the stem between the head and the pulling portion thereof extending through said first bore;
   the fastener being adapted to be installed by relative movement between gripping means which grip the pulling portion of the stem and a nose having a second bore which surrounds the stem, so that the nose is advanced towards the shell and supports it at one end whilst the stem head is pulled into its other end to form a blind head;
   the stem having at least one outward deformation at a position between the shell and pulling portion to retain the shell on the stem, said stem having a radius at the maximum radial height of said deformation which is greater than the radius of said first bore and greater than the radius of said second bore;
   wherein said outward deformation has a relatively shallow sloping profile increasing progressively in the radial direction towards the enlarged head;
   whereby while the fastener is being installed as aforesaid, the nose can move past the deformation by engaging the aforesaid relatively shallow sloping profile and pushing the deformation in towards the stem without carrying material away from the deformation to contaminate the shell.

2. A blind fastener as claimed in claim 1, in which the deformation has a width which is at a maximum at the bottom end of the aforesaid relatively shallow sloping profile, and progressively decreases as the sloping profile increases in height.

3. A blind fastener as claimed in claim 1, including a space adjacent the deformation into which at least part of the material of the deformation is pushed back.

4. A blind fastener as claimed in claim 1, in which the stem carries two deformations on opposite sides of the stem.

5. A blind fastener as claimed in claim 1, in which the or each deformation is formed by pinching between an opposed pair of dies.

6. A method of manufacturing a blind fastener comprising a shell and a stem with an enlarged head, which method comprises the steps of:
   assembling the shell onto the stem towards the enlarged head with said stem passing through a bore of said shell, so as to leave a portion of the stem protruding from the end of the shell remote from the stem head; and subsequent to said assembling step, forming a local deformation on the protruding portion of the stem, to prevent subsequent disassembly of the shell from the stem, by pinching up a peripheral portion of the stem between two opposed dies brought towards each other substantially tangentially of the peripheral portion, the shape of the bite between the two dies being tapered in a direction along the stem; so that the shape of the deformation pinched up by the dies has a height radially of the stem which increases progressively, to a radial extent greater than the diameter of said bore, from the protruding end of the stem towards the head end of the stem.

7. A method as claimed in claim 6, which comprises forming two such local deformations on opposite sides of the stem.

8. A blind fastener manufactured by a method as claimed in claim 6.

9. A blind fastener manufactured by a method as claimed in claim 7.